(12) United States Patent
Lamaj et al.

(10) Patent No.: US 12,092,161 B2
(45) Date of Patent: Sep. 17, 2024

(54) BEARING ASSEMBLY HAVING A SHAFT, A FIRST BEARING, AND A NUT

(71) Applicant: SEW-EURODRIVE GMBH & CO. KG, Bruchsal (DE)

(72) Inventors: Ermalt Lamaj, Mannheim (DE); Jens Blömeke, Riedstadt (DE); Norbert Schneider, Rimbach (DE); Thomas Huber, Karlsruhe (DE); Markus Lutz, Oberhausen-Rheinhausen (DE); Sven Wurzer, Graben-Neudorf (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 134 days.

(21) Appl. No.: 17/795,937

(22) PCT Filed: Dec. 1, 2020

(86) PCT No.: PCT/EP2020/025553
§ 371 (c)(1),
(2) Date: Jul. 28, 2022

(87) PCT Pub. No.: WO2021/151455
PCT Pub. Date: Aug. 5, 2021

(65) Prior Publication Data
US 2023/0143663 A1    May 11, 2023

(30) Foreign Application Priority Data
Jan. 28, 2020   (DE) .......................... 102020000523.3

(51) Int. Cl.
*F16C 35/063*   (2006.01)
*F16C 25/06*    (2006.01)
*F16H 57/08*    (2006.01)

(52) U.S. Cl.
CPC ............ *F16C 35/063* (2013.01); *F16C 25/06* (2013.01); *F16C 2226/60* (2013.01); *F16C 2361/61* (2013.01); *F16H 57/082* (2013.01)

(58) Field of Classification Search
CPC .... F16C 25/06; F16C 35/063; F16C 2226/60; F16C 2361/61; F16H 2057/085
See application file for complete search history.

(56) References Cited

U.S. PATENT DOCUMENTS 2,776,583 A * 1/1957 Williams .................. F16H 3/32
475/225
2,836,473 A * 5/1958 Tydeman .............. F16C 25/083
384/563

(Continued)

FOREIGN PATENT DOCUMENTS

DE     19713211 A1    12/1997
DE     10207396 B4     9/2004

(Continued)

OTHER PUBLICATIONS

Translation of DE10207396 obtained Feb. 6, 2024.*

(Continued)

*Primary Examiner* — James Pilkington
(74) *Attorney, Agent, or Firm* — Carter, DeLuca & Farrell LLP (57) ABSTRACT

A bearing assembly includes a shaft, a first bearing, and a nut. The nut has a thread, which is screwed onto a threaded region formed on the shaft, and a bearing seat formed on the shaft adjoins the threaded region. The inner ring of the first bearing contacts the bearing seat, and the nut contacts the inner ring of the first bearing. The inner ring of the first bearing is arranged spaced apart from the threaded region of the shaft. A runout region of a thread cut into the threaded (Continued)

region of the shaft is arranged in a subsection of the bearing seat adjoining the threaded region.

20 Claims, 5 Drawing Sheets

(56) References Cited

U.S. PATENT DOCUMENTS

| | | | |
|---|---|---|---|
| 2,936,655 A | | 5/1960 | Peterson et al. |
| 4,966,474 A | | 10/1990 | Geiger |
| 5,727,886 A | * | 3/1998 | Hata ..................... F16C 43/04 |
| | | | 384/537 |
| 6,814,684 B2 | * | 11/2004 | Schulz ................. F16C 19/548 |
| | | | 475/331 |
| 9,618,050 B2 | | 4/2017 | Schnebele |
| 11,820,171 B2 | * | 11/2023 | Raya .................... F16B 37/065 |
| 2010/0247016 A1 | | 9/2010 | Rivett et al. |

FOREIGN PATENT DOCUMENTS

| | | | | |
|---|---|---|---|---|
| DE | 10325781 A1 | | 1/2005 | |
| DE | 102004046472 A1 | * | 4/2006 | ......... F16H 57/0479 |
| DE | 102007010314 A1 | | 8/2008 | |
| GB | 2027134 A | | 2/1980 | |

OTHER PUBLICATIONS

International Search Report issued in corresponding International Application No. PCT/EP2020/025553 dated Mar. 5, 2021, pp. 1-3, English Translation.
International Report on Patentability issued in corresponding International Application No. PCT/EP2020/025553 dated Jul. 28, 2022, pp. 1-9, English Translation.

* cited by examiner

BEARING ASSEMBLY HAVING A SHAFT, A FIRST BEARING, AND A NUT

FIELD OF THE INVENTION

The present invention relates to a bearing assembly having a shaft, a first bearing, and a nut.

BACKGROUND INFORMATION

In certain conventional systems, a shaft is rotatably mountable via bearings.

A transmission is described in German Patent Document No. 102 07 396.

A bearing assembly is described in U.S. Pat. No. 2,836,473.

A fixable bearing pre-tensioning assembly is described in U.S. Pat. No. 4,966,474.

An arrangement for fastening a drive pinion is described in U.S. Pat. No. 9,618,050.

A multi-part spacer element for setting the bearing pre-tension is described in U.S. Patent Application Publication No. 2010/0247016.

A self-aligning planetary gear is described in U.S. Pat. No. 2,936,655.

A bearing device for an axle is described in German Patent Document No. 197 13 211.

An axially adjustable bearing assembly is described in UK Patent Document No. 2 027 134.

SUMMARY

Example embodiments of the present invention provide a bearing assembly having an extended service life.

According to an example embodiment of the present invention, a bearing assembly includes a shaft, a first bearing, and a nut, e.g., a shaft nut. The nut has a thread, e.g., an internal thread, which is screwed onto a threaded region formed on the shaft, e.g., which has an external thread, and a bearing seat formed on the shaft adjoins the threaded region. The inner ring of the first bearing contacts the bearing seat, e.g., the inner ring of the first bearing is pushed onto the bearing seat. The nut contacts the inner ring of the first bearing, and the inner ring of the first bearing is arranged spaced apart from the threaded region of the shaft. A runout region of a thread cut into the threaded region of the shaft is arranged in a subsection of the bearing seat adjoining the threaded region.

It is considered advantageous that the nut provides axial fixing by screw connections and radial centering by a snug fit abutting the runout region. Since the runout region of the thread of the threaded region protrudes into the bearing seat, it is possible for an inner-cylindrical snug fit formed on the nut to be pushed onto the runout region and thus centered in the radial direction. Thus, when the nut is screwed onto the shaft, axial and radial fixing is achievable and there is no play in either the axial or the radial direction. In this manner, improved concentricity is achievable. The latter is particularly important in planetary gears, for example.

According to example embodiments, the bearing seat is arranged as a finely machined, e.g., machined using grinding, cylindrical, e.g., outer-cylindrical, surface, e.g., which is only interrupted by a depression that extends out in the runout region. It is considered advantageous that the bearing seat is manufacturable with very high accuracy and the nut can be centered very precisely on this snug fit by the inner-cylindrical snug fit.

According to example embodiments, the nut presses against the inner ring of the first bearing. It is considered advantageous that the first bearing is pre-tensioned and the bearing clearance is therefore reducible.

According to example embodiments, the bearing seat covers a larger region in the axial direction, i.e., for example, in the direction of the axis of rotation of the shaft, than the inner ring of the first bearing. For example, the bearing seat is extended further in the axial direction than the contact region between the bearing seat and the inner ring of the first bearing. It is considered advantageous that the region of high-precision machining of the shaft not only has the axial width of the inner ring, but is wider.

According to example embodiments, the nut has an inner-cylindrical region, e.g., a snug fit, adjoining the thread of the nut, and the region contacts the bearing seat, e.g., the runout region, e.g., is pushed and/or pressed onto it. It is considered advantageous that the nut can be centered on the shaft with high precision and is therefore also aligned with the inner ring, which is centered on the bearing seat.

According to example embodiments, the nut has a circumferential chamfer in the circumferential direction on its edge region oriented toward the shaft. It is considered advantageous that threading of the nut is executable more readily when the nut is pushed onto the shaft.

According to example embodiments, the largest clear internal diameter of the nut in the region of its thread is less than or equal to the clear internal diameter of the inner-cylindrical region adjoining the thread of the nut, e.g., a snug fit. It is considered advantageous here the thread of the nut does not need to run out in the region of the snug fit of the nut.

According to example embodiments, the outer ring of the first bearing is accommodated in a housing, and an outer ring of a second bearing is accommodated in the housing. It is considered advantageous that the shaft is mounted rotatably in relation to the housing.

According to example embodiments, the outer ring of the first bearing is set against a step of the housing, and the outer ring of the second bearing is set against a step of the housing. It is considered advantageous that the two steps are arranged mirror-symmetrically to one another. In the axial direction, therefore, the first of the two steps is ascending, e.g., directed radially inward, and the second of the two stages is descending, e.g., descending directed radially outward.

A radially directed constriction of the housing is therefore provided axially between the two steps. In this region between the two steps, an internal toothing is implementable on the housing or on a ring gear connected in a rotationally-fixed manner to the housing, which meshes with planet gears mounted on bolts, and the bolts are plug connected to the shaft or are arranged integrally, e.g., in one piece.

According to example embodiments, the housing is arranged in one piece, and an internal toothing is formed on the housing.

It is considered advantageous that production is readily provided.

According to example embodiments, the housing is arranged in multiple parts, and the housing has a ring gear having internal toothing. It is considered advantageous that the ring gear can be made of a different material, e.g., ADI, than the housing, which is, for example, made of gray cast iron.

According to example embodiments, the inner ring of the second bearing is pushed onto the shaft, and, for example, the inner ring of the second bearing is set against a step formed on the shaft. It is considered advantageous that the second bearing is accommodated on the shaft.

According to example embodiments, the steps formed on the housing against which the outer rings of the two bearings are set are arranged in the axial direction between the first and the second bearing, and the second bearing is arranged in the axial direction between the first bearing and that step formed on the shaft against which the inner ring of the second bearing is set. It is considered advantageous that the housing is readily producible.

According to example embodiments, the first bearing is arranged in the axial direction between the nut and the second bearing. It is considered advantageous that the nut creates a closed power flow that flows through the two bearings.

According to example embodiments, the inner cylindrical region formed on the nut is arranged in the axial direction between the thread of the nut and the inner ring of the first bearing. It is considered advantageous that high-precision centering is provided.

According to example embodiments, the bearing seat formed on the shaft is arranged in the axial direction between the threaded region of the shaft and the second bearing. It is considered advantageous that centering is provided enabled by the snug fit and thus the concentricity of the shaft is improvable.

According to example embodiments, the shaft is a planet carrier in which planet bolts are accommodated and/or connected, on which planet gears are pushed and rotatably mounted, e.g., by bearings, e.g., needle bearings, that are pushed onto the planet pins, and the toothings of the planet gears mesh with the internal toothing, on the one hand, and with a toothing of a rotatably arranged part, e.g., a sun gear, arranged as a sun gear toothing, on the other hand. It is considered advantageous that the planet carrier achieves a high level of concentricity, e.g., in the case of a flange block output on the output side. Thus, the service life of the transmission, e.g., of the two bearings, is extended overall.

According to example embodiments, the nut has a second inner-cylindrical region, which adjoins the thread of the nut and is arranged on the side of the thread of the nut facing away from the first inner-cylindrical region. For example, the second inner cylindrical region has a smaller clear internal diameter than the smallest clear internal diameter of the thread of the nut and/or is pressed onto a second outer cylindrical region of the shaft, which adjoins the threaded region of the shaft and has a smaller external diameter than the largest external diameter of the threaded region of the shaft. It is considered advantageous that the nut is centered on both sides and thus the concentricity is further improved.

Further features and aspects of example embodiments of the present invention are explained in more detail below with reference to the appended schematic Figures.

DETAILED DESCRIPTION

As schematically illustrated in the Figures, the bearing assembly has bearings (5, 7) accommodated in a housing part, e.g., housing 6 having ring gear, for mounting a shaft. The shaft is arranged as a planet carrier 2 together with a second flange 4 of the planet carrier 2, for example.

Here, the second flange 4 and the planet carrier 2 are connected in a rotationally-fixed manner, e.g., as a single piece, i.e., integrally, i.e., for example, in one piece, or as two parts connected to one another, i.e., for example, in two pieces.

A respective planet bolt 3 is pressed into a bore of the planet carrier 2 and also into a bore of the second flange 4.

A first bearing 7 is pre-tensioned by a nut 1, e.g., a shaft nut, screwed onto an external thread of the shaft. For this purpose, the nut 1 presses the inner ring of the first bearing 7, which is pushed onto the shaft, e.g., the planet carrier 2, in the axial direction towards the second bearing 5. As a result, the shaft is pulled in the opposite direction and the inner ring of the second bearing 5 pushed onto the shaft, e.g., onto the second flange 4, is thus pressed towards the first bearing 7. The outer rings of the two bearings 5 and 7 are located on a shoulder of the housing 6. Therefore, a closed power flow is obtained, which flows from the nut via the planet carrier 2 together with the second flange 4 and the second bearing 5, the housing 6 and the first bearing 7, back to the nut 1.

Both bearings (5, 7) are thus pre-tensioned by the nut 1.

Both bearings (5, 7) are, for example, arranged as angular bearings.

A ring gear having internal toothing is accommodated in the housing 6, or the ring gear is integrated into the housing 6 by an internal toothing being formed on the inside of the housing 6, e.g., axially between the two shoulders.

The planet gears, which are rotatably mounted on the planet pin 3, mesh with the internal toothing, on the one hand, and with the toothing of a rotatably mounted sun gear, on the other hand.

The nut 1 is particularly suitable if the planetary gear stage has a flange block output. Because in this case the external diameter of the planet carrier 2 on the output side is very large. For example, the radial distance region covered by the nut 1 and in relation to the axis of rotation of the planet carrier 2 includes the radial distance region covered by the inner ring of the first bearing 7 or at least the two radial distance regions overlap.

In the bearing assembly described herein, the shaft 2, e.g., the planet carrier 2, has a finely machined bearing seat 30 on which the inner ring of the first bearing 7 is arranged. However, this finely machined bearing seat 30 extends further in the axial direction than the axial region required by the inner ring of the first bearing 7.

A threaded region 32, e.g., an externally threaded region, of the shaft adjoins the bearing seat 30 of the shaft, onto which the nut 1 is screwed using its thread, e.g., an internal thread.

The threaded region 32 is, for example, arranged as an externally threaded region.

During the production of the threaded region 32, a tool, e.g., a cutter, is moved in the axial direction, i.e., for example, in the direction of the axis of rotation of the shaft 2, while the tool produces the thread by cutting. At the end of the threaded region 32, the finely machined, i.e., for example, smooth, cylindrical region of the bearing seat 30 does adjoin; however, the tool produces a runout region 31 when it is moved out radially. This is because the shaft is still rotated in the circumferential direction around its axis of rotation while the tool is being removed in a radial direction, so that a thread lead that runs out in the runout region 31 results. The radial depth of the thread lead, i.e., the helical indentation of the threaded region 32, decreases as the axial distance from the threaded region 32 increases. The smallest radial distance of the thread lead is therefore a strictly monotonically increasing function in the runout region 31 with increasing axial distance from the threaded region 32 until this smallest radial distance reaches the outer radius of the bearing seat 30. The inner ring of the bearing 7 is arranged axially spaced apart from the threaded region 32 and from the runout region 31. The runout region 31 is surrounded by the otherwise finely machined bearing seat 30 because the bearing seat 30 is axially extended further than the inner ring of the bearing 7 and has been manufactured before the threaded region 32 is cut.

Although the raw part of the shaft is only finely machined in the region of the bearing seat 30, e.g., also in the region of the runout region 31 produced later, the raw part is only roughly machined in the region in which the threaded region 32 is later produced, i.e., for example, machined using turning. After the threaded region 32 has been produced, the maximum radial distance in the threaded region 32 is less than half the external diameter of the bearing seat 30. This is because the peaks between the indentations of the thread turn are also machined when the threaded region 32 is produced.

The nut 1 has an internal thread, using which the nut 1 is screwed onto the threaded region 32 of the shaft. The nut 1 has a finely machined inner-cylindrical region adjoining its internal thread area which, when the nut 1 is screwed in, slides onto the bearing seat 30, e.g., the runout region 31, and thus effectuates a radially directed centering of the nut 1 in relation to the shaft, e.g., the planet carrier 2.

In addition, the nut has a circumferential chamfer 112 in the circumferential direction on its end region facing toward the first bearing 7. This facilitates threading in when pushing onto the shaft.

According to example embodiments of the present invention, there is no undercut adjoining the threaded region 32 on the shaft, rather the runout region 31 is connected to the threaded region 32.

Figure 1:
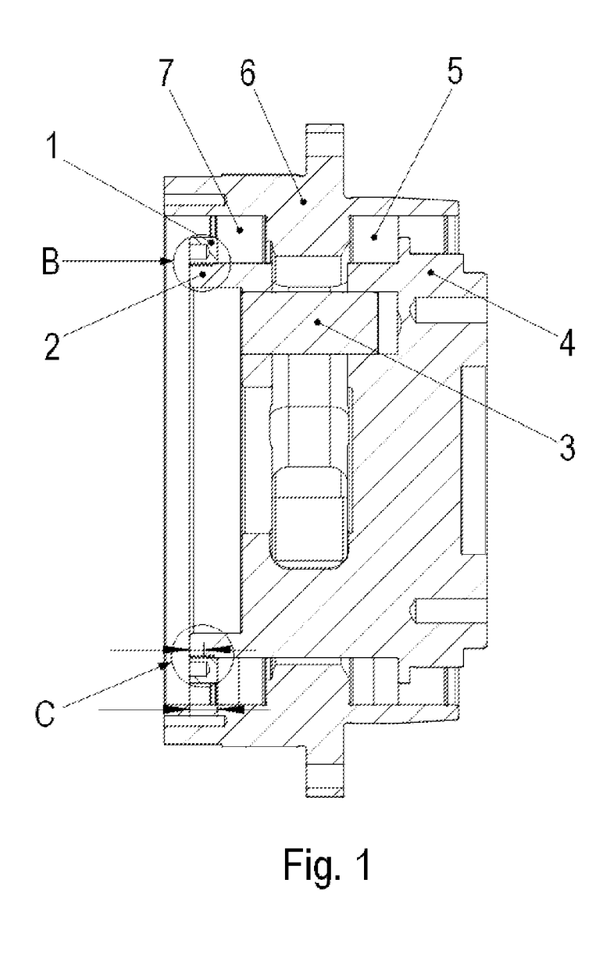
FIG. 1 is a cross-sectional view of a bearing assembly according to an example embodiment of the present invention for a planetary gear.
Figure 2:
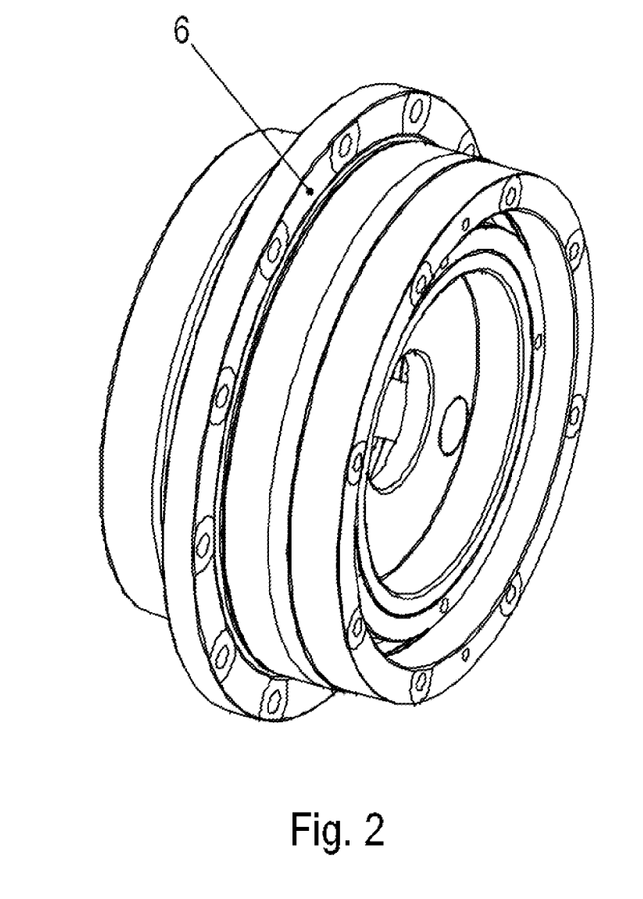
FIG. 2 is a perspective view of the bearing assembly.
Figure 3:
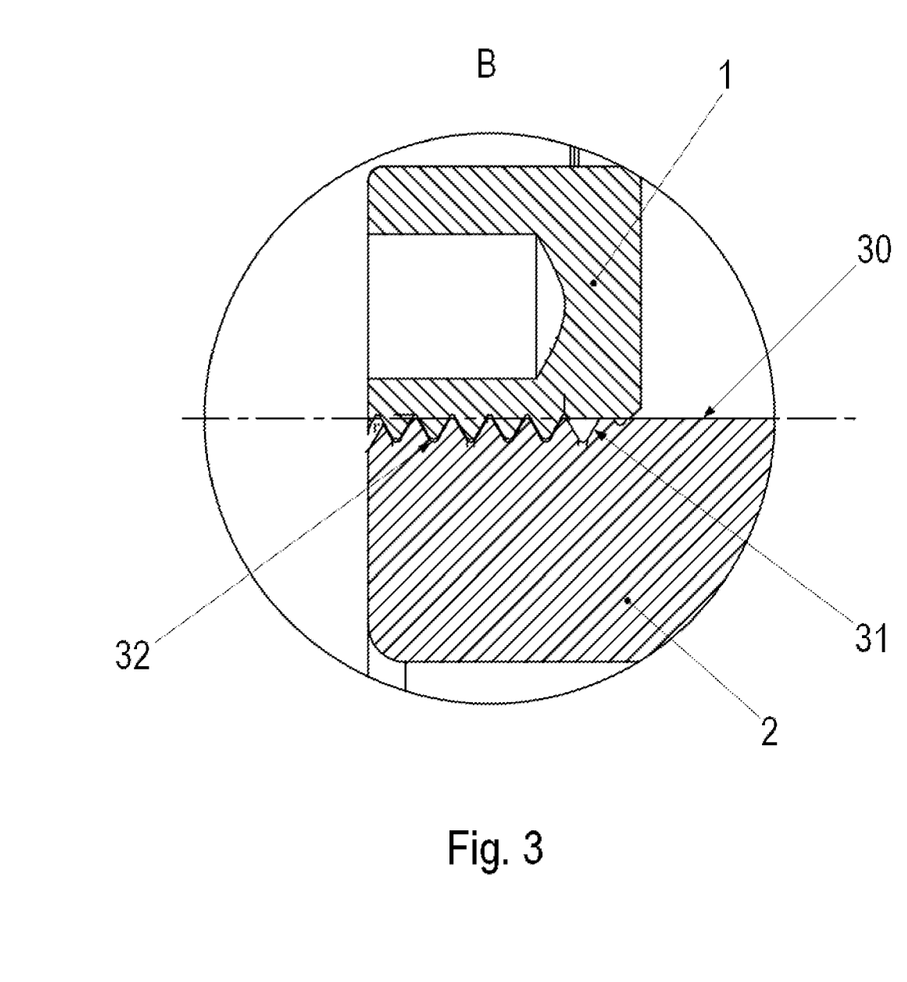
FIG. 3 is an enlarged view of the region identified as B in FIG. 1.
Figure 4:
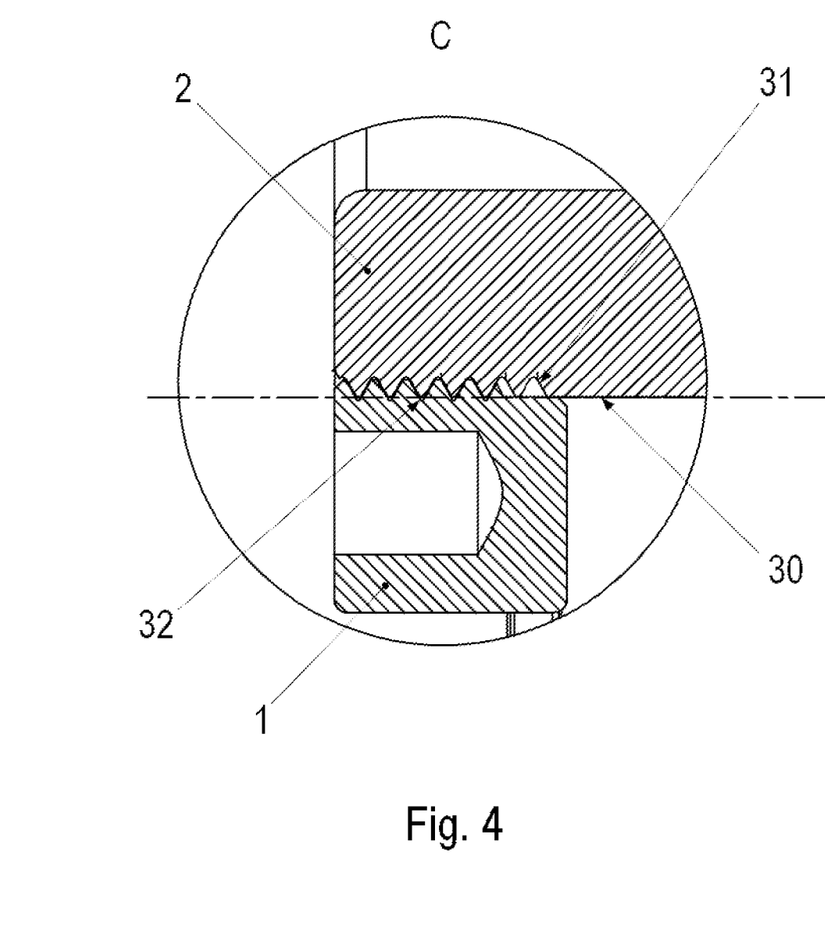
FIG. 4 is an enlarged view of the region identified as C in FIG. 1.
Figure 5:
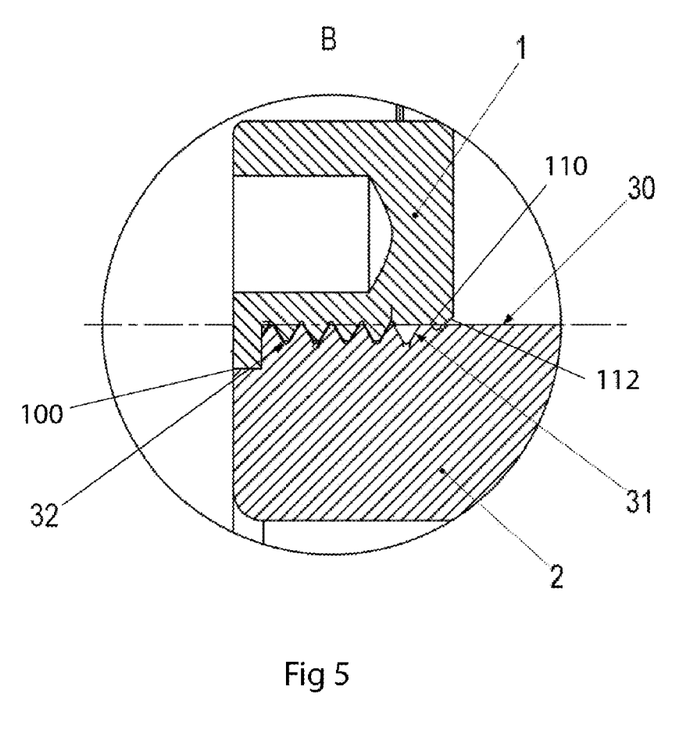
FIG. 5 is an enlarged view of the region identified as B in FIG. 1, in which nut 1 includes two inner cylindrical regions adjoining the tread of the nut 1 axially on both sides.

Referring, for example, to FIG. 5, in In further exemplary embodiments according to the present invention, the nut 1 is not only configured having an inner cylindrical region 110, e.g., a snug fit, at its end region facing toward the first bearing 7, but also at its end region facing away from the first bearing 7. Thus, two inner cylindrical regions 100, 110 adjoin the thread of the nut 1 axially on both sides, in which the clear internal diameter of the second inner cylindrical region 100, i.e., the inner cylindrical region 100 arranged further away from the first bearing, is smaller than the clear internal diameter of the first inner cylindrical region 110. For example, however, it is also smaller than the smallest internal diameter of the thread of the nut 1 and also has a runout region that is required for the cutting tool during the manufacturing of the thread. The shaft has a corresponding outer cylindrical region which adjoins the threaded region 32 on the side facing away from the runout region 31 and is, for example, arranged without a runout region. This means that the nut can be centered on the shaft with a snug fit on both sides, radially and axially without play, and even more improved concentricity is achievable. For example, when the shaft is arranged as a planet carrier, this improves the service life of the planetary gear.

In further exemplary embodiments according to the present invention, the planet carrier 2 is arranged having one flange and is thus mounted in the housing 6 via the two bearings 5 and 7. The planet pins are, for example, only inserted on one side into the respective bores of the planet carrier 2.

The invention claimed is:

1. A bearing assembly, comprising:
   a shaft;
   a first bearing, and
   a nut including a thread threadedly engaged with a threaded region of the shaft;
   wherein a bearing seat arranged on the shaft adjoins the threaded region, an inner ring of the first bearing contacts the bearing seat, the nut contacts the inner ring of the first bearing, the inner ring of the first bearing is arranged spaced apart from the threaded region of the shaft, and a runout region of a thread cut into the threaded region of the shaft is arranged in a subsection of the bearing seat adjoining the threaded region;
   wherein the nut includes a first inner-cylindrical region adjacent to a first side of the thread of the nut and a second inner-cylindrical region adjacent to a second side of the thread of the nut opposite the first side of the thread of the nut, the first inner-cylindrical region having a larger internal diameter than a smallest internal diameter of the thread of the nut and contacting the bearing seat, the second inner-cylindrical region having a smaller internal diameter than the smallest internal diameter of the thread of the nut.

2. The bearing assembly according to claim 1, wherein the nut is arranged as a shaft nut, and the inner ring of the first bearing is pressed onto the bearing seat.

3. The bearing assembly according to claim 1, wherein the bearing seat is arranged as a ground cylindrical surface.

4. The bearing assembly according to claim 3, wherein the cylindrical surface is only interrupted by the runout region.

5. The bearing assembly according to claim 1, wherein the nut presses against the inner ring of the first bearing.

6. The bearing assembly according to claim 1, wherein the bearing seat covers a larger region in an axial direction than the inner ring of the first bearing.

7. The bearing assembly according to claim 6, wherein the bearing seat extends further in the axial direction than a contact region between the bearing seat and the inner ring of the first bearing.

8. The bearing assembly according to claim 6, wherein the axial direction corresponds to a direction of an axis of rotation of the shaft.

9. The bearing assembly according to claim 1, wherein the nut includes a circumferential chamfer in a circumferential direction on an edge region oriented toward the shaft.

10. The bearing assembly according to claim 1, wherein an outer ring of the first bearing is accommodated in a housing and an outer ring of a second bearing is accommodated in and/or set against an step of the housing.

11. The bearing assembly according to claim 10, wherein the housing is arranged integrally and includes an internal toothing.

12. The bearing assembly according to claim 10, wherein the housing includes a ring gear having internal toothing.

13. The bearing assembly according to claim 10, wherein an inner ring of the second bearing is arranged on the shaft and/or is set against a step provided on the shaft.

14. The bearing assembly according to claim 1, an outer ring of the first bearing and an outer ring of a second bearing rest against steps arranged on a housing and arranged in an axial direction between the first bearing and the second bearing, and the second bearing is arranged in the axial direction between the first bearing and a step arranged on the shaft against which an inner ring of the second bearing is set.

15. The bearing assembly according to claim 1, wherein the first bearing is arranged in an axial direction between the nut and a second bearing.

16. The bearing assembly according to claim 1, wherein the first inner cylindrical region arranged on the nut is arranged in an axial direction between the thread of the nut and the inner ring of the first bearing.

17. The bearing assembly according to claim 1, wherein the bearing seat on the shaft is arranged in an axial direction between the threaded region of the shaft and a second bearing.

18. The bearing assembly according to claim 1, wherein the shaft is arranged as a planet carrier in which planet bolts, on which planet gears are rotatably mounted, are accommodated and/or connected and a toothing of each of the planet gears meshes with an internal toothing and with a toothing of a rotatably arranged part.

19. The bearing assembly according to claim 18, wherein the planet gears are mounted on the planet bolts by bearings mounted on the planet bolts, and the rotatably arranged part includes a sun gear.

20. The bearing assembly according to claim 1, wherein the second inner-cylindrical region is pressed onto a second outer-cylindrical region of the shaft that adjoins the threaded region of the shaft.

* * * * *